H. Miller,
Egg-Beater.
Nº 18,759.  Patented Dec. 1, 1857.

UNITED STATES PATENT OFFICE.

HARVEY MILLER, OF CINCINNATI, OHIO.

EGG-BEATER.

Specification of Letters Patent No. 18,759, dated December 1, 1857.

*To all whom it may concern:*

Be it known that I, H. MILLER, of the city of Cincinnati, county of Hamilton, State of Ohio, have invented a new and useful Apparatus for Beating Eggs; and I do hereby declare that the following is a full and exact description thereof, reference being had to the accompanying drawings, made to form part of this specification, and the letters of reference marked thereon.

Similar letters refer to like parts of the improvement.

My invention consists of a cast iron frame having a ratchet bar and revolving beater in combination with a jar or can; this forming an egg beater cheaper in construction and more convenient than any heretofore known.

Figure 2:
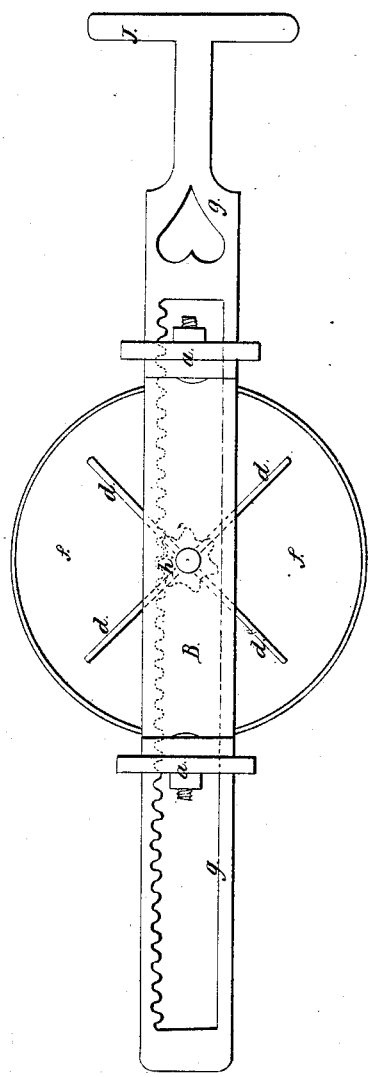
Figure 1:
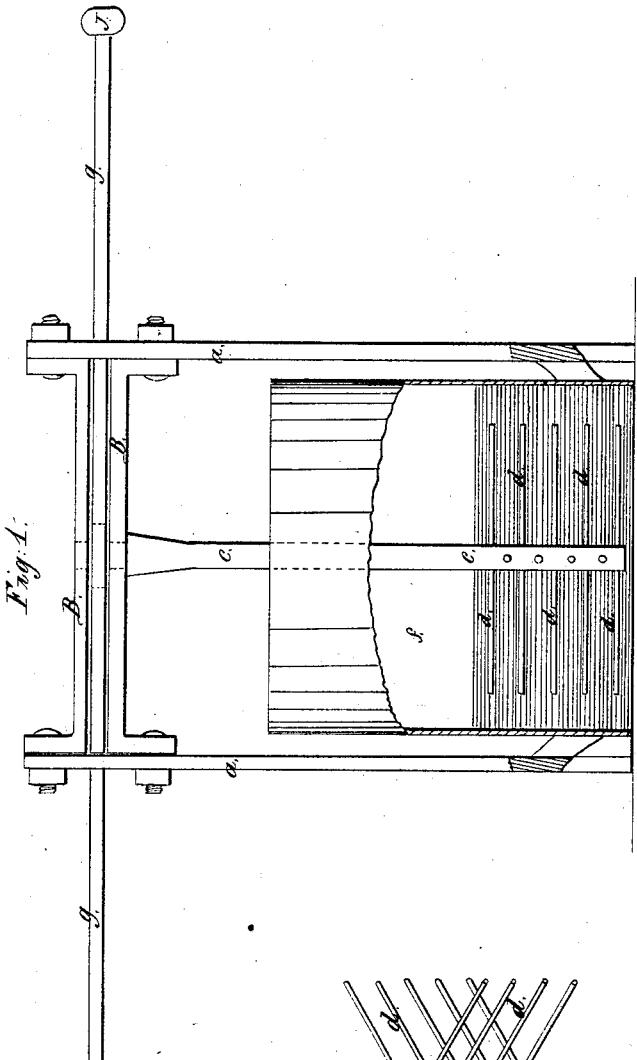
Figure 3:
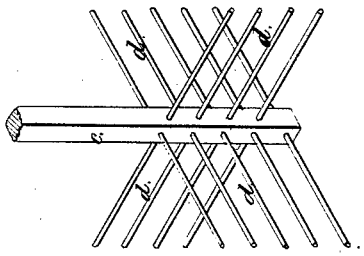

In the accompanying drawings Figure 1, is a side view of my beater, with a portion of the jar in vertical section to show the spindle and floats in position for working. Fig. 2, is a top view of my machine, and Fig. 3 is a portion of the spindle with the floats seen apart from the rest of the machine.

In Figs. 1, and 2, $a$, $a$, are the standards which with the cross bars B, B, form the frame for the operating parts of the machine while the standards $a$, $a$, also clasp the jar or can $f$, and hold it in proper place. Through slots in the upper parts of these standards $a$, $a$, passes a ratchet bar $g$. This bar gears into a pinion E, which is fixed upon the spindle or shaft $c$. This shaft $c$, is supported by the bars B, B, independently of the vessel $f$, and is armed with floats $d$, $d$, for beating the eggs. Neither the shaft nor the floats touch the vessel when the machine is in operation. The standards $a$, $a$, rest upon broad curved feet, which fit the sides of the jar to hold it steady while the eggs are being beaten, yet by simply raising the standards the jar $f$, is separated entirely from the machine. By this arrangement, if one hand be placed upon the upper bar B to hold the machine steady, while with the other hand upon the handle $j$, of the ratchet bar $g$, a reciprocating motion be given to the ratchet bar, then the spindle $c$, with its floats $d$, is set in rapid motion, alternately revolving in each direction. This motion beats the eggs with great rapidity and ease.

The vessel $f$, for containing the eggs, is of porcelain or tin, and without a cover. The floats $d$, $d$, are made of iron wire, and all the other parts are of cast iron. The floats and part of the shaft $c$, as seen in Fig. 3, should be coated with tin.

Experienced cooks are well aware that the air should have free access to eggs in the process of beating, without its being laden with moisture, as is the case where a closed vessel is used. In this the common beaters are defective, as also in that they have inaccessible parts difficult to cleanse; and the vessel designed to hold the eggs being generally bolted or screwed to the frame, its removal occasions vexatious delay when the beaten eggs are to be poured out.

In my egg beater the air has free access, and the jar having no step in the bottom to receive the lower end of the shaft $c$ and being readily separable, can be washed with ease, while the beaten egg can be removed without a moments delay as the vessel is left free by simply raising the standards. The floats can also be separated and cleansed readily.

I do not claim the ratchet bar or revolving shaft and beaters, but what I do claim as an improvement in egg beaters and desire to secure by Letters Patent of the United States is:

The frame $a$, B, having a ratchet bar $g$ and revolving beater $c$, $d$, in combination with the jar or can $f$, substantially as described for the purposes set forth.

H. MILLER.

Witnesses:
CHARLES H. FOX,
W. BENSON.